M. W. HORNSBY.
ELECTRIC WATER HEATER.
APPLICATION FILED FEB. 19, 1921.
1,429,735. Patented Sept. 19, 1922.
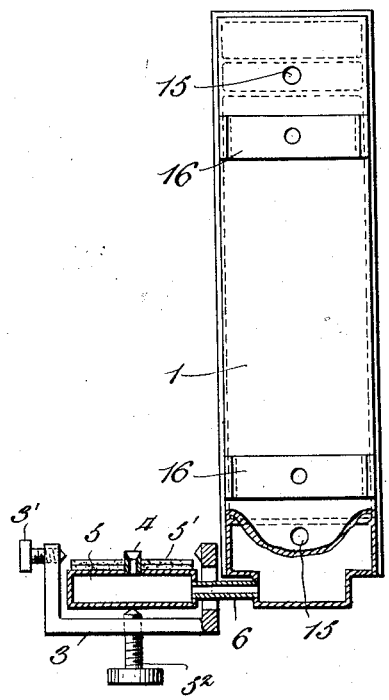
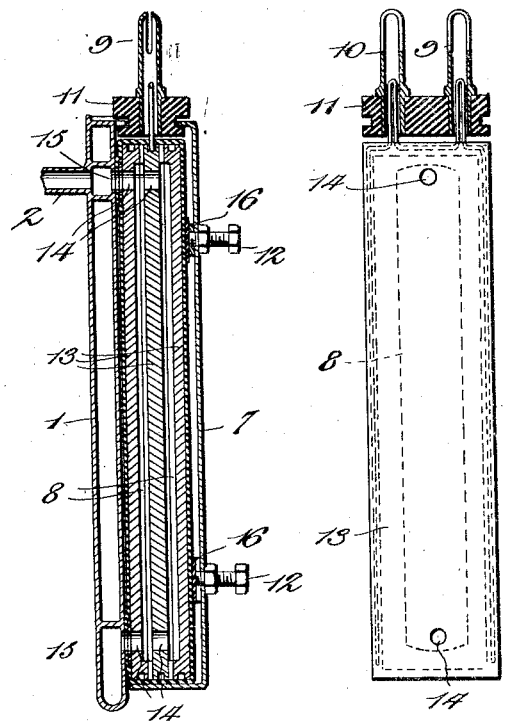
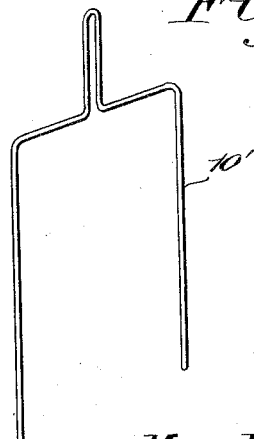
Moses W. Hornsby, INVENTOR
BY Victor J. Evans, ATTORNEY
WITNESS: J. W. Ely.

Patented Sept. 19, 1922.

1,429,735

UNITED STATES PATENT OFFICE.

MOSES W. HORNSBY, OF NEW YORK, N. Y., ASSIGNOR TO SOUTHERN ELECTROLYTE BATTERY COMPANY, INC., OF NEW ORLEANS, LOUISIANA, A CORPORATION OF LOUISIANA.

ELECTRIC WATER HEATER.

Application filed February 19, 1921. Serial No. 446,353.

*To all whom it may concern:*

Be it known that I, MOSES W. HORNSBY, a citizen of the United States, residing at New York, in the county of New York and State of New York, have invented new and useful Improvements in Electric Water Heaters, of which the following is a specification.

The present invention relates to an apparatus for electrically heating water in a continuous and very rapid manner. The temperature of the latter may be as high as that of boiling water without the necessity of changing the intensity of the current, but simply by regulating the charge; the principal feature of the apparatus is that the circuit is closed only when the water passes through it, so that it may remain permanently connected, the current passing through only when water supplied from any suitable source passes through it. The apparatus acts as a liquid rheostat, the liquid in this case being water.

The apparatus, which in the small sizes, is portable may be adapted to ordinary water supply faucets by means of suitable fittings.

In said figures:

Figure 1 is an elevation partly in section of the front part of the apparatus.

Figure 2 is a transverse section of the complete apparatus.

Figure 3 is an elevation of the elements forming the heater.

Figure 4 is a perspective view on a larger scale of the heater and its protective covering.

Figure 5 is a view of the conductors of current fitted to the exterior of the cells composing the liquid heater.

The apparatus comprises essentially the following parts:

A metal piece of rectangular shape 1 receives the water to be heated through a tube 6, which communicates with a small cylindrical reservoir 5 having an aperture in its center at 4. The whole is mounted on a suitable support 3, which may be connected to any faucet by means of a binding screw 3' and suitable clasps; a tight joint is obtained by means of a rubber washer 5' arranged on top of the reservoir 5; a binding screw 5² permits of tightening the washer against the faucet.

Said metal piece 1 is covered by an electrically insulated metal cover 7. In the space formed by said cover is arranged the heating element with its connections.

In the form shown this element is composed of a series of small rectangular plates 13 of suitable material, and separated by an insulating rubber joint of very slight thickness. Two of the plates are provided with holes 14, 14 at the top and bottom; when the plates are screwed against one another and against the piece 1, these holes coincide with the holes 15, 15 provided in said piece. The rectangular joints applied against the small plates leave a small cell 8 between the latter permitting the water to circulate in the form of a very fine sheet; the cell is shown in dotted lines in Figure 3. The distance between the plates in Figure 2 has been exaggerated to make the drawing clear.

Piece 1 is furthermore provided at the top with a water outlet tube 2. When the apparatus is connected to a faucet and the water admitted, the latter enters through the tube 6 and passes through the tube 2 after having passed through the cells.

The conductors numbering in this case three are fitted on three of the sides of the rectangle; said conductors are composed of copper or other metal wires and are fork-shaped as indicated in Figure 5.

The number being three, the two ends are connected with each other as shown in Figure 4; the two connected conductors being shown at 9 and the sole conductor at 10'. The vertical ends of these conductors penetrate into the contacts 9 and 10 mounted on a piece of insulating material 11 and held in place by the cover 7.

The plates and their conductors are surrounded by a protective insulator and water proof covering 7'. To prevent leakage a tight joint is obtained between the holes 14 and 15 by means of suitable rubber washers. The tightening of the elements is obtained by means of binding screws 12, 12, Figure 2 acting upon small fiber bars 16, 16.

The operation is extremely simple.

Supposing the apparatus to be connected to a faucet and its contacts connected to an electrical source in the usual manner, the current will pass only when the water circulates by reason of the arrangement of the conductors.

By reason of this construction the temperature of the water may be easily regulated simply by regulating the charge. With a slight charge the water will be brought to boiling, while with a greater charge warm or tepid water only will be obtained. Although the current passes only when the water is admitted, it is always preferable to cut off the current when the apparatus is not in use.

It will be obvious to anyone technically trained that considerable modifications in the form of the apparatus may be introduced without in any way changing the spirit of the invention. The manner of connecting the apparatus to a water supply for example may vary considerably as the case may be and this applies also to the apparatus when instead of being portable as in the case described, they are stationary and of large capacity.

What is claimed is:

An electric water heater embodying an electrode included in a normally opened circuit, and comprising a plurality of carbon elements of elongated contour, and a plurality of insulating members arranged between the carbon element and spacing the latter, said carbon elements having alined openings adjacent the ends thereof, said insulating members having longitudinal slots defining channels between the carbon elements, said channels communicating through said openings alternately from the bottom and top of the electrode, a protective covering for said electrode, an elongated receptacle at one side thereof having a water inlet and water outlet, said water admitted to the electrode completing the circuit when bridging the space between the carbon elements.

In testimony whereof I hereby affix my signature.

M. W. HORNSBY.